United States Patent [19]

Barber

[11] Patent Number: 5,343,386
[45] Date of Patent: Aug. 30, 1994

[54] APPARATUS FOR MAKING ELECTRONICALLY-PRODUCED POSTCARDS AND METHOD OF OPERATING SAME

[75] Inventor: Pamela L. Barber, Del Mar, Calif.

[73] Assignee: Imageware Software, Inc., San Diego, Calif.

[21] Appl. No.: 943,131

[22] Filed: Sep. 10, 1992

Related U.S. Application Data

[63] Continuation of Ser. No. 397,172, Aug. 21, 1989, abandoned.

[51] Int. Cl.⁵ .................... G06F 15/66; H04N 7/18
[52] U.S. Cl. .................... 364/400; 364/401; 358/350
[58] Field of Search .......... 358/244, 332, 76; 364/400

[56] References Cited

U.S. PATENT DOCUMENTS

| | | | |
|---|---|---|---|
| 3,398,664 | 8/1968 | Bonatsos | 95/14 |
| 3,864,708 | 2/1975 | Allen | 354/290 |
| 4,037,249 | 7/1977 | Pugsley | 358/76 |
| 4,052,739 | 10/1977 | Wada et al. | 358/294 |
| 4,130,834 | 12/1978 | Mender et al. | 358/127 |
| 4,539,585 | 9/1985 | Spackova et al. | 358/93 |
| 4,561,061 | 12/1985 | Sakamoto et al. | 364/550 |
| 4,602,280 | 7/1986 | Maloomian | 358/93 |
| 4,687,526 | 8/1987 | Wilfert | 156/64 |
| 4,688,105 | 8/1987 | Bloch et al. | 358/335 |
| 4,731,743 | 3/1988 | Blancato | 364/521 |
| 4,786,944 | 11/1988 | Sakamoto et al. | 355/20 |
| 4,796,180 | 1/1989 | Riley | 364/400 |
| 4,805,037 | 2/1989 | Noble et al. | 358/335 |
| 4,823,285 | 4/1989 | Blancato | 364/521 |
| 4,841,378 | 6/1989 | Cogert | 358/335 |
| 4,864,410 | 9/1989 | Andrews et la. | 358/443 |
| 4,872,056 | 10/1989 | Hicks et al. | 358/183 |
| 4,891,660 | 1/1990 | Biondo, Jr. | 354/412 |
| 4,910,661 | 3/1990 | Barth et al. | 364/167.01 |
| 4,959,670 | 9/1990 | Thayer, Jr. | 334/76 |
| 4,965,673 | 10/1990 | Bozzo et al. | 358/335 |

FOREIGN PATENT DOCUMENTS

| | | |
|---|---|---|
| 084064 | 7/1983 | European Pat. Off. . |
| 0235398 | 9/1987 | European Pat. Off. . |
| 0326515 | 8/1989 | European Pat. Off. . |
| 3422285 | 4/1988 | Fed. Rep. of Germany . |
| 0206098 | 8/1989 | Japan . |
| 2078411 | 1/1982 | United Kingdom . |

OTHER PUBLICATIONS

"Kodak color printer gains support for broad base of graphics applications", news release from Dialog File 16, PTS Prompt TM.

"Kodak highlights electronic photography at video expo", news release from Dialog File 16, PTS Prompt TM.

Primary Examiner—Roy N. Envall, Jr.
Assistant Examiner—A. Bodendorf
Attorney, Agent, or Firm—Knobbe, Martens, Olson & Bear

[57] ABSTRACT

An apparatus housed in a booth for automatically producing printed postcards incorporating a self-portrait of the user integrated into a pictorial background including a cash-receiving device, a computer triggered by cash received in the device, a video camera in the booth to view the user, a video monitor on which the video camera image of the user is displayed, a series of pictorial backgrounds in digitized electronic form stored in the computer for selective withdrawal therefrom by the user to be integrated with their image and a printer for obtaining the integrated user's pose and pictorial background and printing it on a postcard for immediate use.

29 Claims, 8 Drawing Sheets

APPARATUS FOR MAKING ELECTRONICALLY-PRODUCED POSTCARDS AND METHOD OF OPERATING SAME

This application is a continuation of application Ser. No. 07/397,172, filed Aug. 21, 1989, now abandoned.

BACKGROUND OF THE INVENTION

1. Field of the Invention

This invention pertains to the field of electronic color imaging. More particularly, the invention pertains to an apparatus for electronically producing printed picture postcards, carrying a self-portrait of the user, integrated with a pictorial background elected by the user, a process for using the apparatus to create this self-portrait postcard and the unique product produced thereby.

2. Description of the Prior Art

In the field of picture portraits, it is known to provide a painted backdrop for an individual to stand before, whose picture is taken by a camera so that the end result is a photograph showing the person's image superimposed against the backdrop. Another method is to provide a painted backdrop with holes or apertures cut therein in which a person places his or her face or head to be photographed to reveal the person as having their head superimposed on another background such as another person's body.

Photographs taken in front of painted backdrops present a number of problems. The camera is delicate and must be continually handled to load and unload film, thus the ever-present danger of equipment damage. The number and size of backdrops represents a storage problem and continuously moving them in and out of position causes deterioration to the painted surfaces. The total effort of arranging the backdrops and the user as well as the time taken to load the camera, arrange the backdrop and subject, take the picture and unload the camera, as well as the film developing time make it a long process. Finally, developed film is not the sturdiest of mediums and substantial damage to the film and picture quality may take place, even after slight handling.

In other respects, efforts have been undertaken to obtain a person's image by a video camera and transpose that image via a dot matrix printer onto a t-shirt or other tangible medium. In these situations, either no background is used or a pre-printed background is placed on the t-shirt. In either event, the choice of backgrounds is confined to the product itself and any attempt to increase the number of backgrounds would require more paintings, more backdrop boards or a larger inventory of pre-printed t-shirts.

On another subject, many travelers desire to communicate with their friends and acquaintances throughout their travels. These persons often desire to send a photograph of themselves in front of or near some place of interest encountered during the trip. Using pictures taken with standard roll-type film requires another person to take the picture, having the picture taken in good weather, being in front of the place of interest when the picture is taken, as well as the extra steps of having the film developed, the pictures printed, enclosing the finished pictures in an envelope and applying letter postage for mailing to the recipient. Often, the traveler desires nothing more than to place a small message on the back of a postcard. Heretofore, there have been no postcards available which include the self-portrait of the user available on an instant basis.

This invention comprises a novel apparatus for taking a self-portrait of the user, integrating it in one or more of a plurality of backgrounds chosen by the user and the self-portrait and background printed onto a picture postcard for immediate use thereafter. The self-portrait of the user is obtained after a short time during which the user changes position, while observing the portrait, to determine the most desirable pose. The background may be chosen from a plurality of preset backgrounds that may be indigenous to the area wherein the apparatus is located so as to eliminate the need of the user to physically be at that background when the self-portrait is integrated therein or pictorially represent other backgrounds. The apparatus produces the postcard containing the user's portrait integrated therein while allowing a clearly defined area on the backside of the postcard for application of a message, the address of the receiver and postage for immediate mailing.

The apparatus includes a cash-receiving device, a computer, a video camera, a video monitor, a printer, and a novel means to receive, store and, on command, present a pictorial background and instructions to the user flashed onto the monitor for quick and simple utilization by the user. The apparatus is preferably housed in a booth for location near heavily traveled tourist routes to facilitate use by many persons. While fully automated following manual input initiation, this novel apparatus and process provides the user with the novel features of viewing themselves in a variety of poses, to obtain the best pose, freedom to choose from a variety of backgrounds and rapid production of the finished postcard. The user is therefore easily able to send a fun, colorful record of their trip to friends and relatives showing them in front of a choice of backgrounds without bothering others to take their picture, be photographed in backgrounds showing locations they may not, for one reason or another, be able to visit or photograph and further to save on postage costs by using postcard postage in lieu of letter postage. In addition, the postcards are electronically printed and may be kept by the user as a memento or souvenir of their trip or mailed to friends and relatives. The unique postcard produced by the apparatus shows as a color print as opposed to dot matrix-produced prints hereinbefore known in the art.

SUMMARY OF THE INVENTION

This invention comprises an apparatus that includes a cash-receiving device, in which the user deposits money for the production of one or more postcards, that activates a sequence of electrically driven operations through computer-stored program instructions. A video camera, constantly on, is trained on the user and transforms the image received therein to a series of digitized electric impulses. Upon deposit of money, a television monitor with its screen facing the user displays the user's pose while a message displayed on the monitor instructs the user to select a pictorial background. A first means is provided for receiving pictorial backgrounds, converting them to digitized form and storing them in a subassembly of the computer ready for selection by the user and includes means within reach of the user for selecting one of these backgrounds. Upon selection by the user, the chosen background file is withdrawn from the memory and passed through a second means, for integration with the user's pose as seen by the video camera and display to the user on the television monitor screen.

At the appropriate sequence in the computer instructions, the selected background and integrated self-portrait is transferred in digitized form back to the color video printer wherein the totally integrated self-portrait and selected background are color printed on one side of a small paper of the size, shape and weight of a postcard. The paper is preprinted on the opposite side with areas for postage, address and a message. Additionally, a color video finisher is optionally provided to seal the computer printed picture to the paper.

The computer instructions follow a time sequence involving default values to continue the program in a timely manner despite the failure of the user to select a background or their attempts to select more than one background or otherwise attempt, either wilfully or negligently, to alter the flow sequence operations.

In another embodiment, a booth is provided in which to store the equipment out of reach of the user and other unauthorized personnel as well as to provide a separate area wherein the user may sit or stand in private while the video camera views his or her pose and displays it on the monitor.

This invention also comprises the novel process of automatically transferring a real time image of the user onto a mailable post card, integrated into a background chosen from a supply of electronically-stored backgrounds by the steps of providing a ready money-accepting device to receive the proper money or multiples thereof to begin the sequence of electronically driven operations through computer-stored program instructions, providing a series of pictorial backgrounds in digitized electronic form stored in a computer subassembly for selective withdrawal to be integrated with the self-portrait and simultaneously displayed on the video monitor to the viewer, providing a video camera to view the user and transfer the image to a video monitor, providing computer means for receiving the selected self-portrait pose and integrated pictorial background and transferring it to the color video printer, providing postcard-sized printable paper with the printer for the finished picture to be printed thereon and providing a computer-stored set of instructions to be issued in proper sequence to all the components to provide full automation to the process. From this novel combination of components and process for controlling them, a picture postcard is produced by fully automatic means, without the need of an attendant or other operator, the card produced with improved handlability and containing electronically produced images and a self-portrait of the user.

Accordingly, the main object of this invention is an apparatus and process of using the apparatus to produce novel electronically generated postcards containing a self-portrait of the user integrated with a pictorial background selected by the user. Other objects of the invention include an apparatus and process for using that eliminates the need for photographic film and produces the postcard purely from electronic impulses part of which are housed in a computer subassembly and the rest thereof being received from the user through the means of a video camera; an apparatus for producing electronically printed postcards eliminating the necessity of the user being photographed in front of the area constituting the background of the postcard; an apparatus and process of using to rapidly produce a novel postcard containing the self-portrait of the user integrated into a background of the user's choice in the form of a postcard that is immediately available for use and for mailing; an apparatus housed in a novel booth that is amenable to location at a variety of points in the mainstream of tourist travel; an apparatus which eliminates the need for an operator or other attendant; and an electronically produced postcard containing the portrait of the user integrated into a background of the choice of the user.

These and other objects of the invention will become more apparent upon reading the following description of the preferred embodiment taken together with the drawings attached hereto. The scope of protection claimed by the inventors may be gleaned from a fair reading of the claims that conclude this specification.

DESCRIPTION OF THE PREFERRED EMBODIMENT

Figure 1:
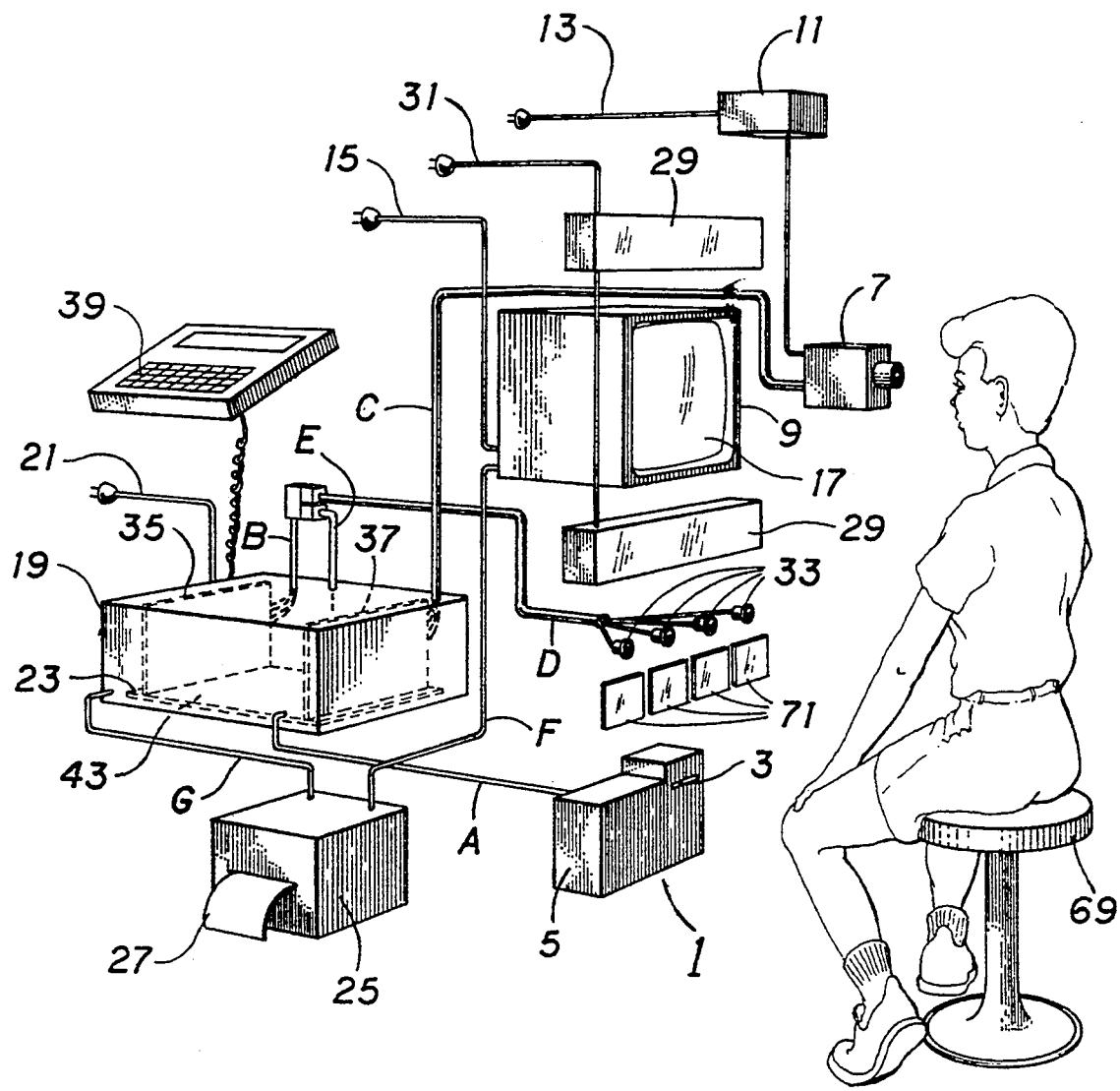
FIG. 1 is a block diagram of a preferred embodiment of the apparatus in accordance with the present invention showing the various components that are used to produce the electronically printed postcard of this invention.

FIG. 1 shows a person positioned before an array of equipment comprising the apparatus of this invention. The apparatus includes a cash-receiving device 1, including an entry port 3 and a protected receptacle 5. An example of such a device usable herein is an OBA-4 available from Rowe International, 1500 Union Ave. S.E., Grand Rapids, Mich. 49507.

A video camera 7 is provided and directed at the user to receive his or her pose for later display on a video monitor 9. Camera 7 is energized through a power supply 11 that in return receives power through a power cord 13; monitor 9 receives external power through power cord 15. Video camera 7 is preferably of the "R-G-B" analog-type as opposed to the transistorized or composite-type is preferred for use in this invention so as to produce a finer image. An example of a video camera usable herein is a Panasonic WDV 5000 or JVC-CCD-RGB video camera.

Video monitor 9 has a view screen 17 that is directed at the user for viewing the various backgrounds and poses. Monitor 9 is preferred to be of the type such as an RGBS analog-level, signal-type monitor. Analog signal monitors are preferred to transistorized versions because they give greater color control. A typical monitor usable herein is a Sony, Model CPD-1310.

A computer 19, powered by electricity through power cord 21, is provided and contains a mother board 23 and is programmed to correlate and control the operations of the various components. An example of a computer usable herein is an IBM AT Personal Computer. A color video printer 25 is provided to print an image of the user, integrated with a pictorial background, on postcard-size pieces of electronic print paper 27. An example of a color video printer usable herein is a Kodak SV6500.

A series of lights 29, energized by a power cord 31 are provided and directed at the user to illuminate his or her face to obtain a high-quality reproduction on video screen 17. A series of selector buttons 33 are provided within easy reach of the user for selecting a background to be integrated with their pose for printing on postcard 27.

Prior to setting up the apparatus, the components are interconnected and power cords 13, 15 and 31 attached to external electric energy sources. A series of cables, their respective schematic diagrams shown in FIGS. 6-11, are used to interconnect the components: Cable A (FIG. 7) connects cash-receiving device 1 to computer 19; Cable B (FIG. 6, 10) connects selector buttons 33 through an interface board 35 in computer 19 to the "game" port of computer 19 using Cables D and E; Cable C (FIG. 11) interconnects video camera 7 to a computer graphics digitizing board 37 located in computer 19; Cable F (FIG. 9) interconnects monitor 9 with printer 25; and, Cable G (FIG. 8) interconnects printer 25 to computer graphics digitizing board 37.

Before the apparatus is placed in service, several pictorial backgrounds are converted to digitized electronic form and entered into computer 19 through graphics digitizing board 37. A keyboard is connected to computer 19 for this purpose.

Figure 2:
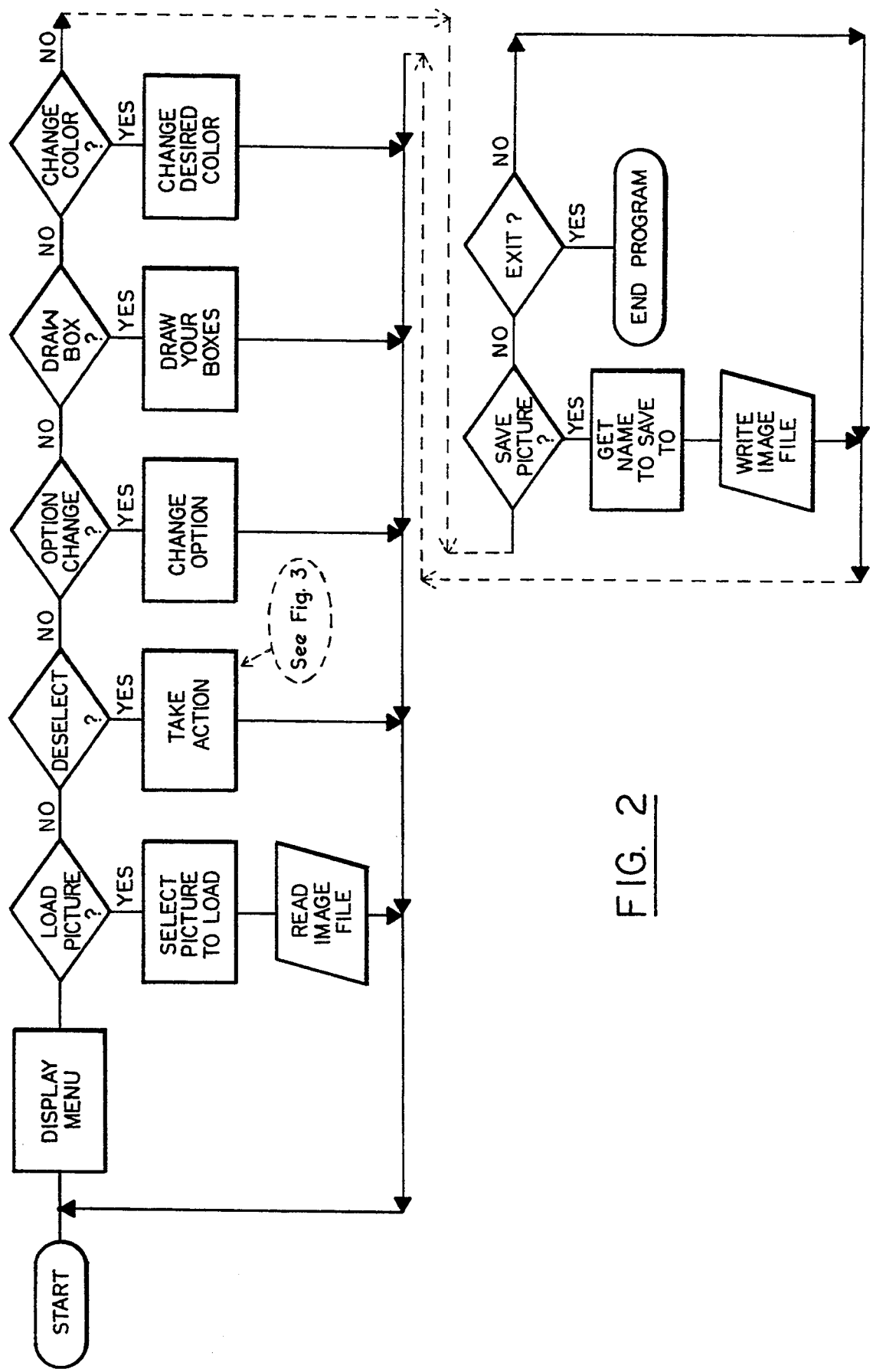
FIGS. 2, 3 and 4 are logic diagrams showing how a pictorial background is converted to digital form and installed in the computer.
Figure 3:
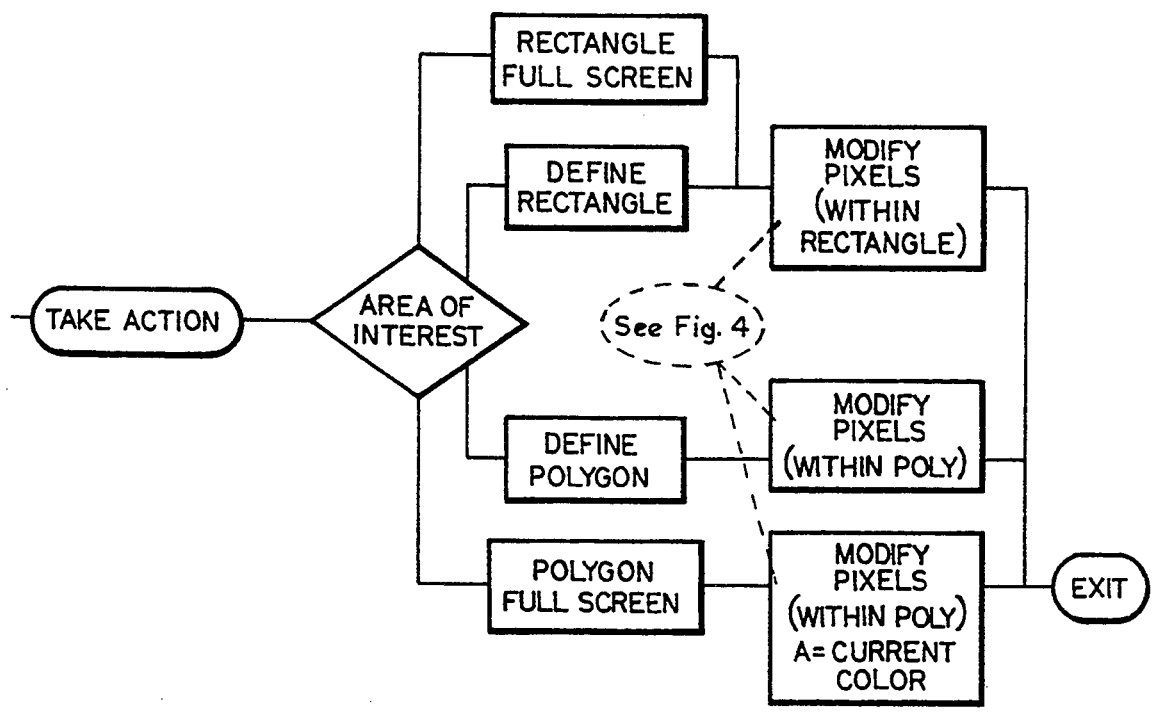
Figure 4:
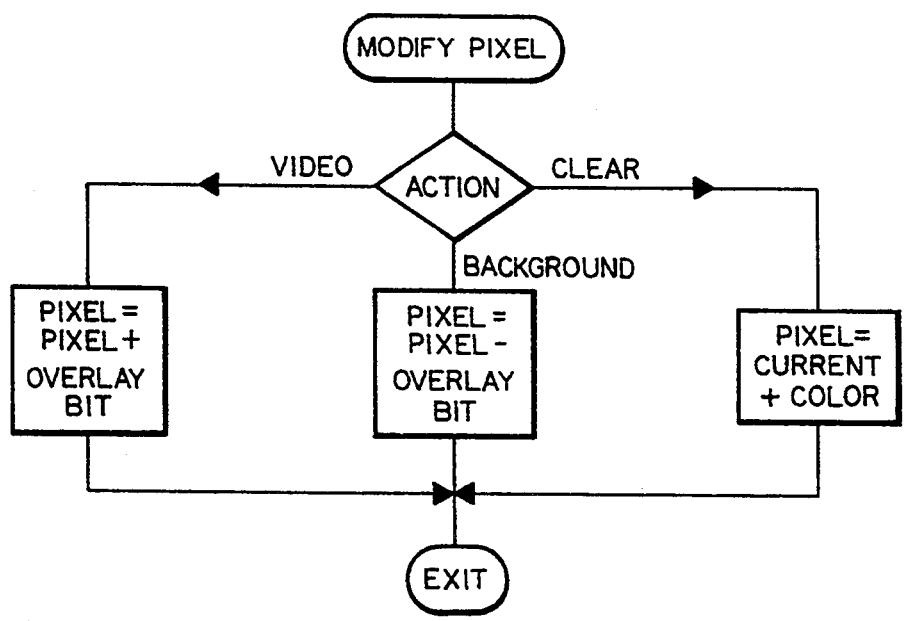

The logic diagrams for incorporating pictorial backgrounds into computer 19 and storing them in the computer memory are shown in FIGS. 2, 3 and 4, and are self-explanatory. The symbols shown in the figures conform to the International Organization for Standardization (ISO) International Standard 1028—"Information Processing—Flowchart Symbols" and the American National Standard, Flowchart Symbols and Their Usage in Information Processing, ANSIX-3.5—1970.

Backgrounds that are displayed on video monitor display screen 17 and that appear as the printed backgrounds in postcard 27 are loaded into computer 19 as follows: A "background" may be any image created by computer Graphics design or by inputting any video signal of a photograph, television image, painting, collage, etc., into computer 19 through digitizing board 37. Accordingly, the backgrounds can be made by artistic rendition, by photographs, by actually viewing the background with a video camera and using a video camera to view them and to convert the impulses received in the camera into a video signal. The video signal is loaded into computer 19 through digitizing board 37. One type of such a digitizing board is a "TARGA 16" (trademark) board available through Truevision, 7351 Shadeland Station, Suite 100, Indianapolis, Ind. 46256. Also available through Truevision is software such as True Image Processing Software (TIPS) (Trademark) which allows a user to address the board.

The incoming video signal is sent in red, Green and blue controlled by a "sync" mode into board 37 which resides in a 16-bit slot on the mother board of computer 19. Board 37 has two female 9-pin plugs—one for incoming information and one for outgoing information. The video signal is fed into the input plug. By using a software program such as the TIPS software's main menu and communicating with computer 19 through a Microsoft (trademark) mouse or such other input device as described in the Truevision manual, one may select the "video" mode. A video sub-menu appears that allows the user to view the live video and then select one frame (1/30th of a second) in a "capture" mode.

Digitizing board 37 captures, stores and displays one whole screen of video information by translating the three video signals into digital information displayable in pixels. Once captured and temporarily stored as the "working image" on the board, a further sub-menu allows the user to select a "save picture" command which, when selected, requests the user to name the "file". The user must then use keyboard 39 interfaced computer 19 to name the file using up to eight characters. Upon entering the characters and using the "enter" key on keyboard 39, the file is saved as an eight-character name with a file tail, such as ".TGA" in the case of the TARGA board.

This 400,000 plus byte file is stored as any other file in the directory or sub-directory in which the digitizing board software resides. By using software, based upon the flow diagrams shown in FIGS. 2, 3 and 4, a background file may be retrieved from the memory and displayed on monitor 9. A software program of this type is obtainable from Practically Perfect Productions, Inc., 1125 Camino Del Mar, Suite D, Del Mar, Calif. 92014, under the name "PPP.BUILD". This PPP.BUILD program is entered by typing the executable command into keyboard 39 and de-selecting the mouse to make the main menu appear. By selecting the command "load picture", the program requests the user to type in the name of the pictorial background "file" to be loaded. By doing so and selecting "enter" on keyboard 39, the selected file is loaded into the active program.

The PPP.BUILD program then requires the user to select the commands "background" and "full". The image is now fully loaded. The program allows the user to select any pixel and switch it to video by selecting "video" and either "rectangle" or "poly". If the user selects "poly", the user must then, using the mouse, identify the polygon which is desired to be the video window.

Figure 5:
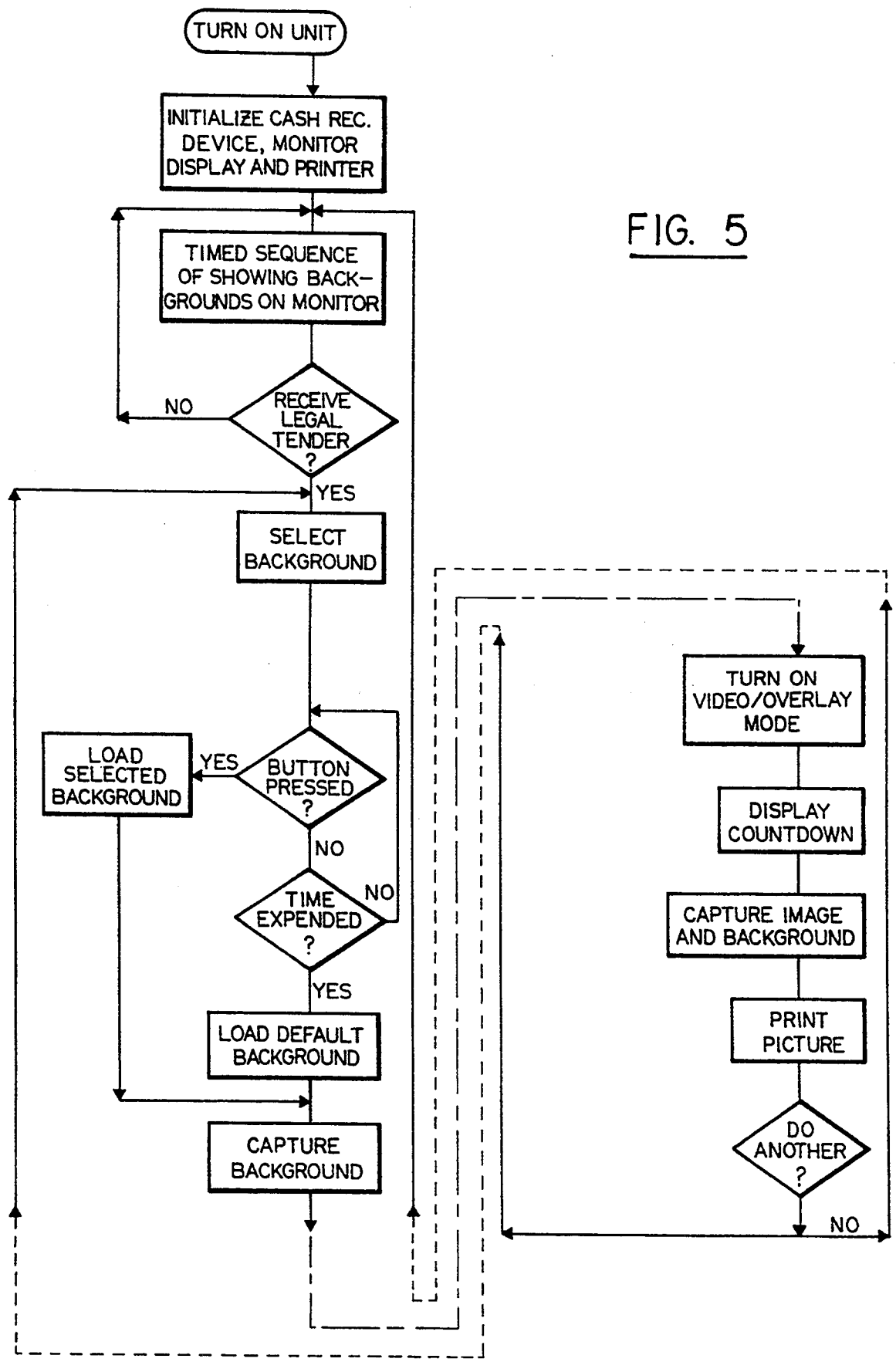
FIG. 5 is a logic diagram showing the automatic operation of the apparatus.

The logic diagram for automatic operation of the apparatus is shown in FIG. 5 and is self-explanatory. Video camera 7 and lights 29 remain constantly on while the apparatus is in an operational mode. A series of pre-programed pictorial backgrounds are sequentially displayed on video screen 17. Upon receipt of the appropriate quantity or a multiple of the appropriate quantity of legal tender in cash-receiving device 1, such as $2 for one postcard, $5 for three postcards, a command is produced in cash-receiving device 1 and sent through Cable A to computer 19 to begin actuation of a series of pre-programed operating sequences.

Upon receipt of the command, computer 19 causes the sequenced pictorial backgrounds to be deleted from monitor screen 17 and replaced by instructions that, inter alia, request the user to select one background using selector buttons 33. Reproductions 71 of the pictorial backgrounds are placed near each button so that the user will know which button will bring up the desired background onto monitor screen 17. A time period is then initiated in which the user may select the desired background. Should a background not be selected at the end of the period, computer 19 is programmed to default and send a signal, calling for a pre-selected background, to printer 25.

A different set of instructions are now displayed on monitor screen 17, notifying the user that he or she has a certain time period in which to select a personal pose to be integrated with the selected background; a separate time period, independent of the time period for selecting the background, is initiated to control this operation. The user may change poses before video camera 7 and observe them on video screen 17. Near the end of the time period, a notification appears on the screen warning of the expiration of the time. Thereafter, computer 19 is programmed to receive the final pose of the user, taken at the end of the time period, and integrate it with the selected pictorial background and send that composite to printer 25.

Printer 25 is charged or filled with an inventory of precut pieces of electronic print paper 27 of the size and shape of a postcard that has printed on one side the divisions characteristically seen on a picture postcard such as a delineated area for the address, the postage stamp and a brief message. The pieces of paper are stacked or fed in printer 25 so that the printer prints the integrated images of the user and the selected background on the side opposite the preprinted areas and causes this printed, or finished, postcard to be discharged to the user. Postcard 27 produced by this invention is novel in itself in that it portrays the user integrated into the selected background with no holes or empty portions at the interface of the user and the background.

In addition, computer keyboard 39 may be used for inputting additional instructions to computer 19 for such things as diagnostic tracers and test procedures to test the operativeness of each of the components.

Figure 6:
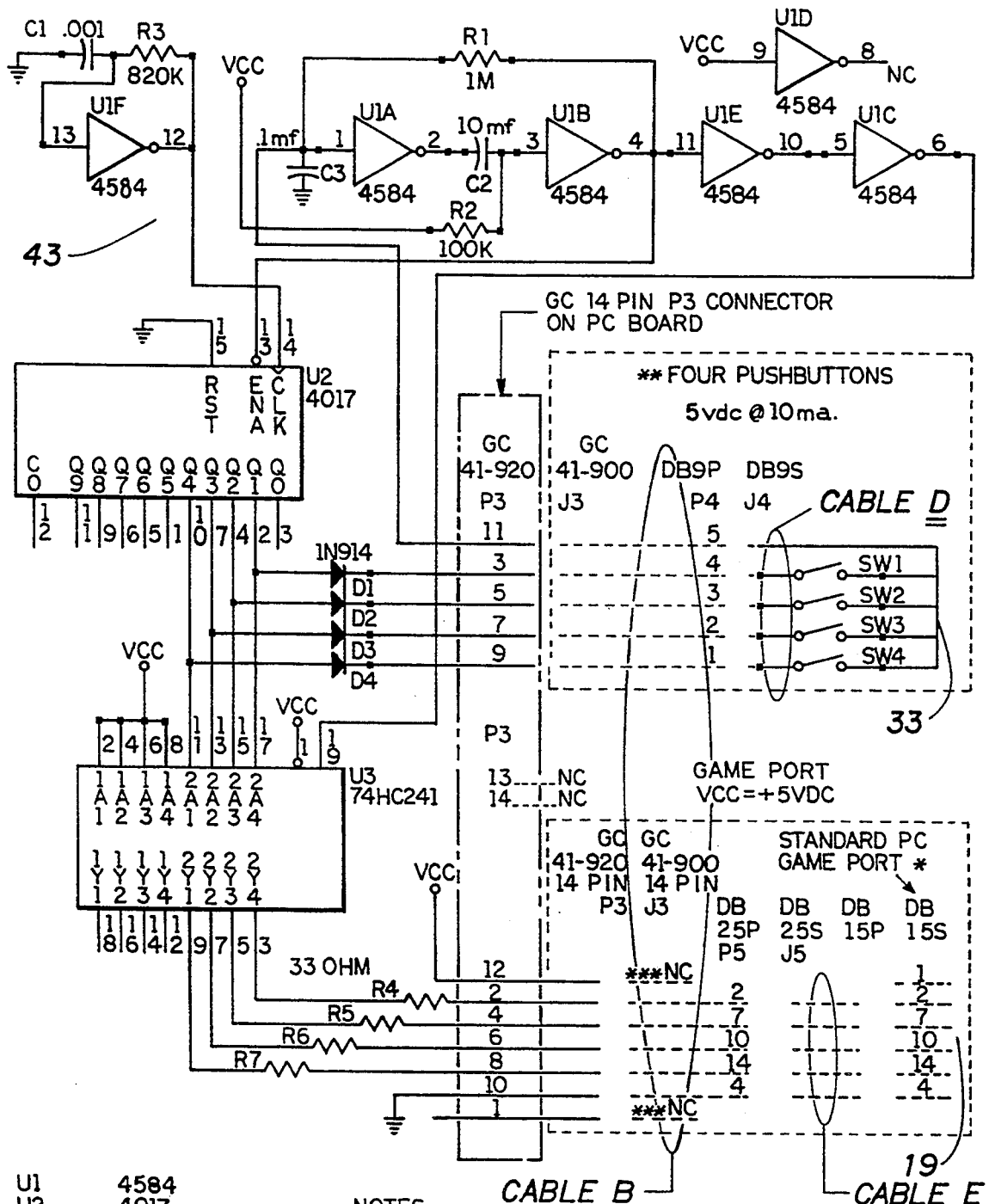
FIG. 6 is a schematic diagram of an interface circuit used with cables B, D, E shown in FIG. 1.
Figure 7:
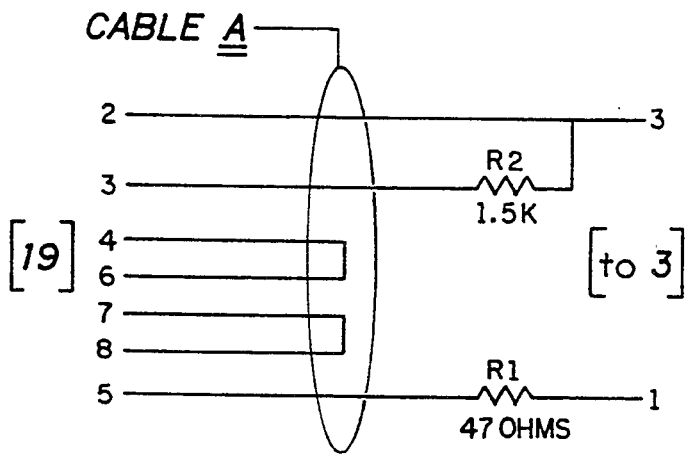
FIG. 7 is a schematic diagram of cable A shown in FIG. 1.
Figure 8:
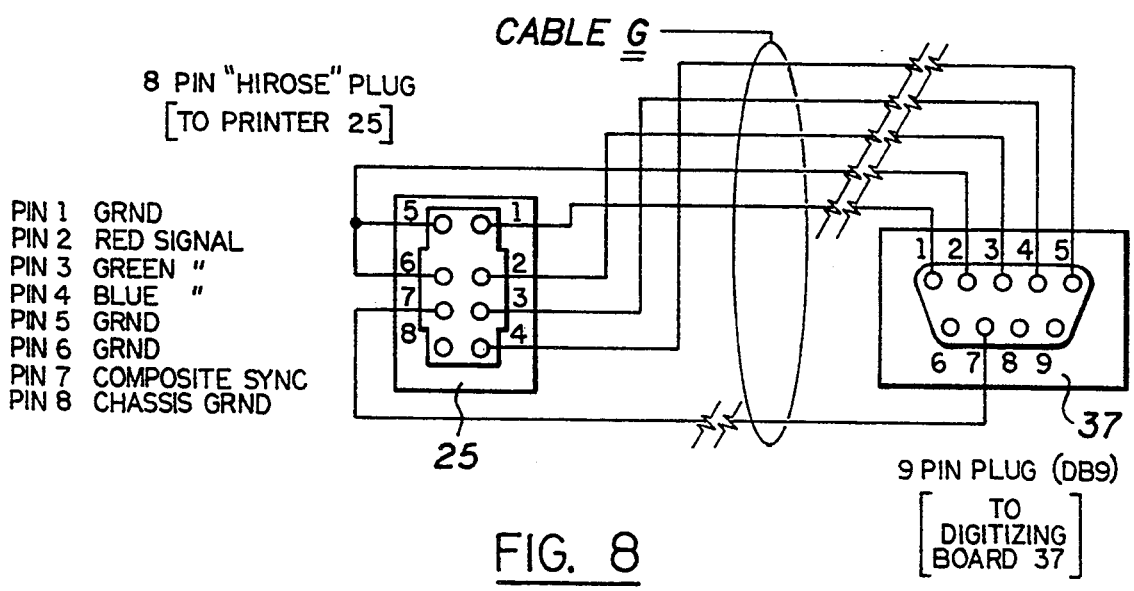
FIG. 8 is a schematic diagram of cable G shown in FIG. 1.
Figure 9:
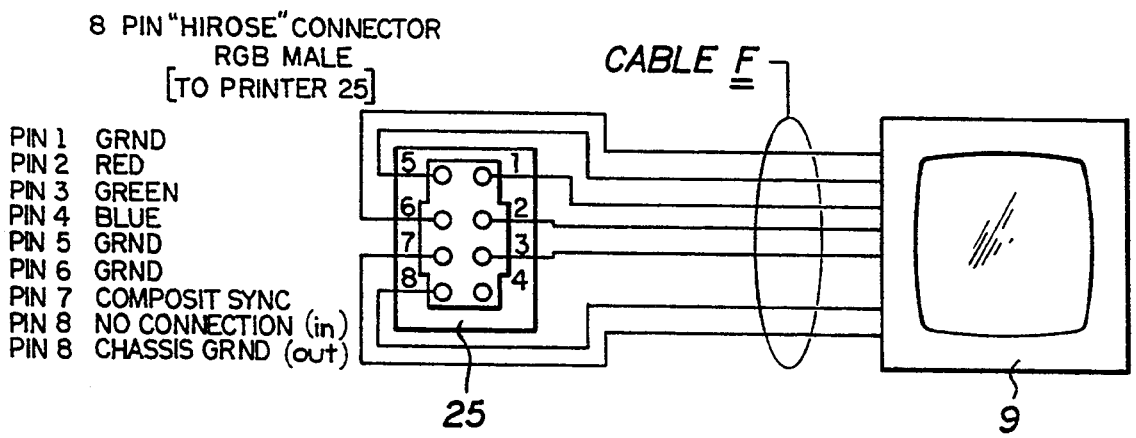
FIG. 9 is a schematic diagram of cable F shown in FIG. 1.
Figure 10:
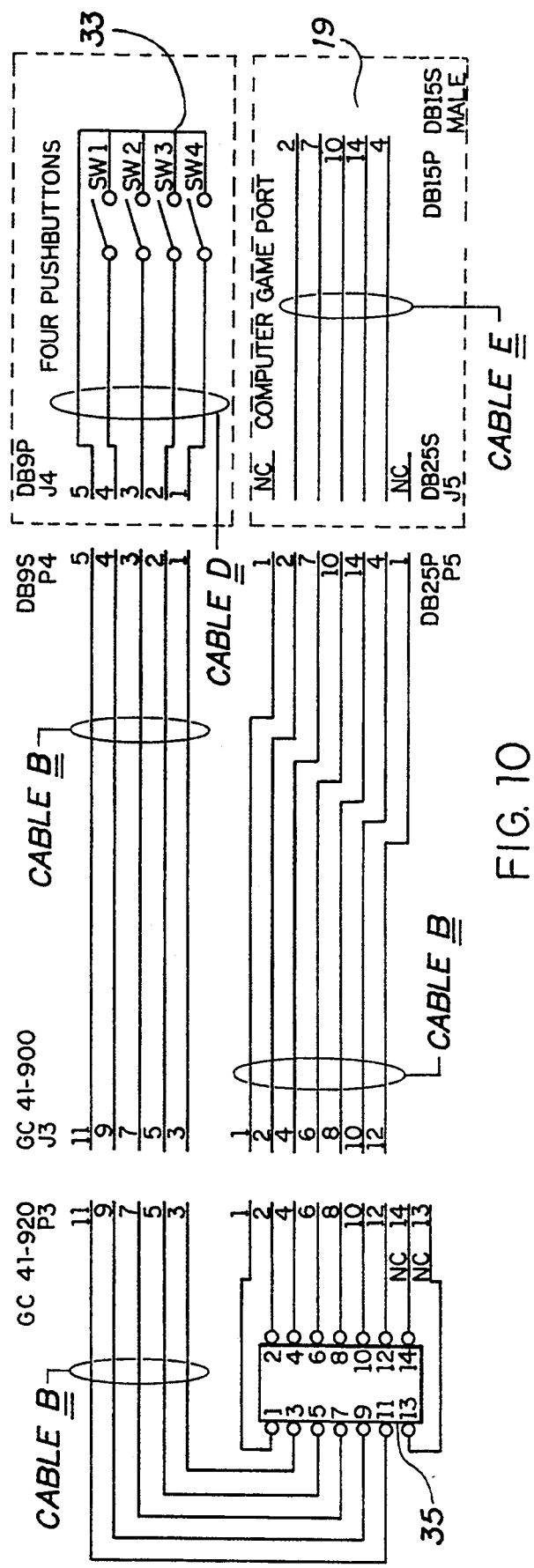
FIG. 10 is a schematic diagram of cables B, D, E shown in FIG. 1.
Figure 11:
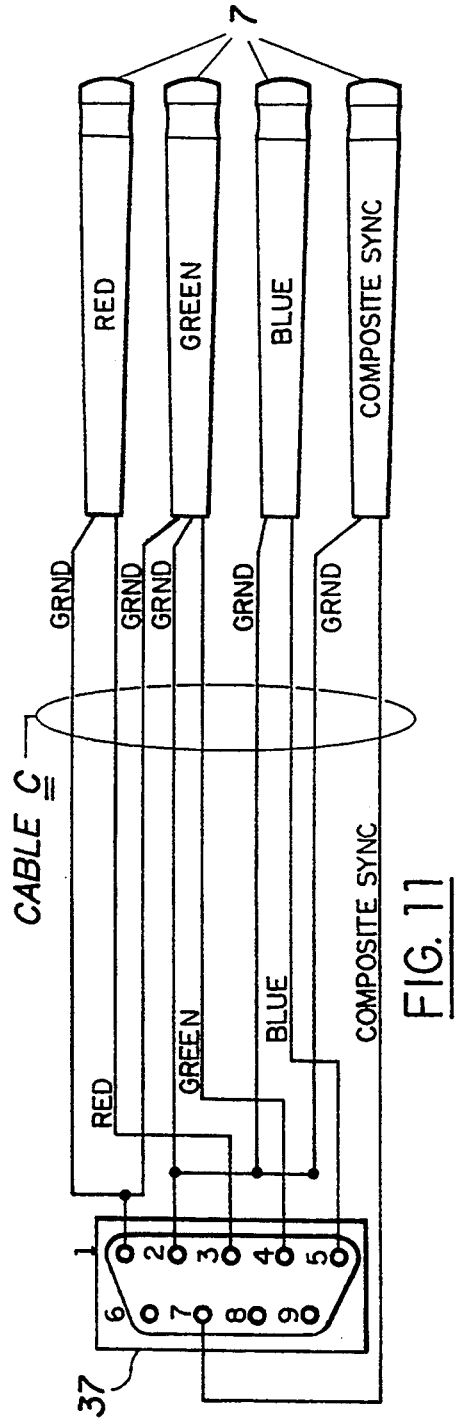
FIG. 11 is a schematic diagram of cable C shown in FIG. 1.

To prevent the user from damaging the apparatus by pressing more than one of selector buttons 33, a special interface circuit 43 is provided and used with Cable D. FIG. 6 shows the special circuit; its operation is as follows: When the full vend cash is received in device 1 and is acknowledged by computer 19, an instruction appears on monitor screen 17 that states, "SELECT BACKGROUND". Selector buttons 33 are connected to a 5-volt d.c. system. When one of four push buttons 33 is pressed, which completes the circuit, a high signal goes to pin 1 of U1 (4584) which is a Hex Schmitt Trigger. Pin 2 goes low; C2 discharges pin 3 which goes low. Pin 4 goes high which initiates two operations: (1) it starts (enables) the clock pulse on U2, pin 13, so that U2 will start to run; (2) U1 pin 11 goes high, pin 10 goes low, pin 5 goes low, pin 6 goes high, which enables the output on U3 74HC241 at pin 19.

U1—such as Motorola MC14584—Hex Schmidt Trigger works as an oscillator. It also provides a clock for U2 (4017). When one of buttons 33 is pressed by the user, the oscillator is stopped when a match is found. This prevents multiple signals from appearing at the same point if more than one button is pressed.

U2—such as a CD4017 (National Semiconductor) is a decade counter/decoder:
pin 15 ground
pin 13 clock enable
pin 14 clock
pin 10 selector button 33—#4
pin 7 selector button 33—#3
pin 4 selector button 33—#2
pin 2 selector button 33—#1

U3—such as a 74HC241 (RCA) is an Octal Tri State Buffer (translates pulse to binary so that CPU can understand):
pin 19 output enable
pin 11 selector button 33—#4—IN count
pin 13 selector button 33—#3—IN count
pin 15 selector button 33—#2—IN count
pin 17 selector button 33—#1—IN count
pin 9 selector button 33—#4—OUT count
pin 7 selector button 33—#3—OUT count
pin 5 selector button 33—#2—OUT count
pin 3 selector button 33—#1—OUT count Typical parts making up circuit 43 are shown below:

| ITEM | NAME | TOL. | DESCRIPTION | PINS | MANUFACTURER |
| --- | --- | --- | --- | --- | --- |
| U 1 | MC14584B | | HEX SCHMIDT TRIGGER | 14 | MOTOROLA |
| U 2 | CD4017B | | DECADE COUNTER | 16 | NAT'L. SEMICONDUCTOR |
| U 3 | CD74HC241 | | OCTAL 3-STATE BUFFER | 20 | RCA |
| C 1 | .001 uf | 10% 50 V | MYLAR CAPACITOR | | |
| C 2 | 10 uf | 20% 50 V | ELECTROLYTIC CAP. | | |
| C 3 | .1 uf | 10% 50 V | MYLAR CAPACITOR | | |
| C 4 | .1 uf | 20% 15 V | CERAMIC DISC CAP BYPASS | | |
| C 5 | .1 uf | 20% 15 V | CERAMIC DISC CAP BYPASS | | |
| C 6 | .1 uf | 20% 15 V | CERAMIC DISC CAP BYPASS | | |
| D 1 | 1N914B | | DIODE | | GENERAL ELECTRIC |
| D 2 | 1N914B | | DIODE | | GENERAL ELECTRIC |
| D 3 | 1N914B | | DIODE | | GENERAL ELECTRIC |
| D 4 | 1N914B | | DIODE | | GENERAL ELECTRIC |
| R 1 | 1M OHM | 5% | RESISTOR ¼ WATT | | |
| R 2 | 100K OHM | 5% | RESISTOR ¼ WATT | | |
| R 3 | 820K OHM | 5% | RESISTOR ¼ WATT | | |
| R 4 | 33 OHM | 5% | RESISTOR ¼ WATT | | |
| R 5 | 33 OHM | 5% | RESISTOR ¼ WATT | | |
| R 6 | 33 OHM | 5% | RESISTOR ¼ WATT | | |
| R 7 | 33 OHM | 5% | RESISTOR ¼ WATT | | |
| P 3 | GC 41-920 | | 14 PIN CONNECTOR OR SIMILAR | | |

The program shown in FIG. 5 must reside in a "root" directory, along with any ASCII file editor (such as EDLIN). The program will control the entire function of the apparatus. Several parameters are left up to the user of the program. These are held in a file with a typical path as follows:

C:ETCPPPPPP.CFG

This file can be changed with EDLIN. Each entry in this file resides on a line by itself. Each entry starts with a key word followed by a vertical bar. One or more arguments can follow (depending on the meaning of the key word.) Below is a list of the key words and their meaning:

MONEY: n—"n" is an integer from 1 to 32000 such as "3" This indicates how many hits are required from device 1 before starting the program.

TWOFER: n—"n" is an integer from 1 to 32000 such as "5". This indicates how many hits are required from device 1 before starting the program and delivering two postcards 27. This "n" value must be greater than "money".

SELECT: filespec (such as C:select.tga). This is the image that will appear after money is tendered and before the customer selects the background. Example:
BKG-1:filespec
BKG-2:filespec
BKG-3:filespec
BKG-4:filespec These are the background images that the video will be overlaid upon. They contain the suffix ".tga" to address them in computer 19.

THANX: filespec—This is the image that will be overlaid after the customer's picture has been captured and the printing is in progress.

TEXT: filespec—This is unchangeable. Filespec is a valid MS-DOS filespec. It may contain the drive letter followed by a colon and a path each node prefaced by a backslash.

While it is possible to establish the inventive apparatus for use outdoors using natural light or possibly natural light augmented by artificial light through lights 29, a preferred embodiment of the invention is to house the aforesaid apparatus in a booth. A booth provides more privacy to the user, a better choice of lighting to the equipment and is therefor preferred over the non-booth type.

Figure 12:
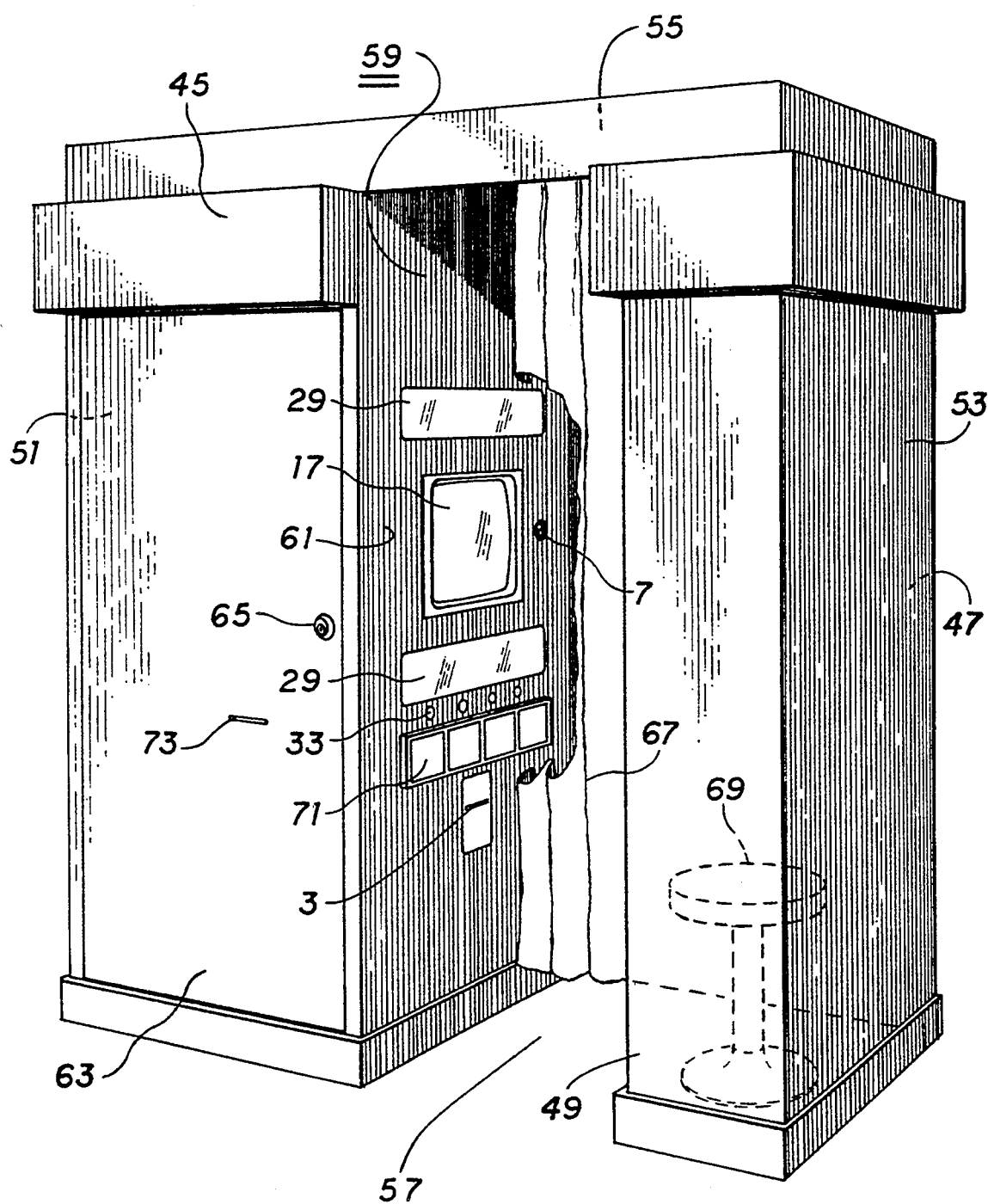
FIG. 12 is an illustrative view of one embodiment of the booth housing the apparatus including an alcove for use by the user in obtaining the novel printed postcard.

A typical booth 45 for housing the aforesaid equipment for utilization by the user is shown in FIG. 12. Booth 45 comprises an enclosure bounded by a rear wall 47 and separate front wall 49 held in spaced-apart relation by a pair of spaced-apart end walls 51 and 53, all joined together along their respective vertical edges and topped by a roof 55. An opening 57 is formed in front wall 49 to allow access to an alcove 59 formed interior of booth 45 and separated from the rest of the interior by an equipment wall 61 spanning between front and rear walls 47 and 49. A door 63 is made as part of front wall 49 for access using door knob 65 to the other interior area of booth 45 where the apparatus of this invention is housed. A curtain 67 is slidingly hung over opening 57 for closing by the user to darken alcove 59 when using the apparatus and a stool 69 is located in alcove 59 on which the user may sit.

On wall 61, in full view of the user, is cash-receiving device slot 3, apertures through which are presented the lens of video camera 7, monitor screen 17, the glowing part of lights 29, pictorial representations 71 of the backgrounds that can be selected and selector buttons 33. A slot 75 is formed in door 63 and aligned with the output slot of printer 25 to allow the user to exit alcove 59, thereby allowing use of the alcove by another user while postcard 27 is being printed. This arrangement permits more usable time for the apparatus and a higher profit for the apparatus' owner and allows easy access to printer 25, to refill of a charge of clean post cards 27, without having to pass by computer 19 thereby reducing the potential for introducing dust from outside booth 45 into computer 19 and other components therein.

What is claimed is:

1. Apparatus for automatically producing printed pictures incorporating a self-portrait of a user comprising:
    a) an initiation device for producing electronic signals in response to a user input;
    b) a computer connected to said initiation device and programmed with a set of instructions that define a series of operating sequences in response to the signals received from said initiation device;
    c) digitizing means within said computer for converting a series of pictorial backgrounds into digitized electronic impulses, such that said digitized electronic impulses for each of said pictorial backgrounds are held in separate files, in a memory in said computer for selective withdrawal;
    d) an analog video camera operably mounted to view the user and receive a video impression thereof and to convert said view to a series of electrical impulses, said electrical impulses further converted to a set of digitized electronic impulses by said digitizing means;
    e) a video monitor including a monitor screen mounted within view of the user, for receiving a real time image of the user;
    f) first means, mounted within reach of the user, for selecting a pictorial background from said memory having files, for later presentation in visual form on said monitor screen;
    g) second means in said computer, activated by said first means, for digitally combining said set of digitized electronic impulses from the video camera view of the user with said digitized electronic impulses of the pictorial background selected by the user so as to define a digitized electronic representation of the user's image integrated into the pictorial background and transferring said impulses in an electronic array to said video monitor for display to the user;
    h) a color video printer, loaded with an inventory of electronically-printable papers and activated in sequence by means responsive to said set of computer instructions, for receiving said electronic array of impulses, comprising the pictorial background and a fixed pose of the user, and printing, in response thereto, a finished color representation of the user, integrated in said selected background, on one side of one of said papers as a finished picture; and
    i) a source of light positioned adjacent the user to illuminate the user to facilitate receiving a video impression of the user by said video camera.

2. The apparatus of claim 1 including a manual keyboard operably connected to said computer for inputting additional instructions to said computer to vary the operating sequences of said apparatus.

3. The apparatus of claim 1 including means responsive to an additional set of instructions in said computer to test each component's operation and produce a signal in response thereto.

4. The apparatus of claim 1 including a series of impulses projected on said video monitor as words of instruction to instruct the user to select a pictorial background, to advise the user of the time allowed to change poses in front of said video camera and alert the user when his or her pose is to be captured by said video camera and sent to said video printer.

5. The apparatus of claim 1 wherein said video camera is a color video camera.

6. The apparatus of claim 5 wherein said color video camera is an R-G-B analog-type camera.

7. The apparatus of claim 1 wherein said video monitor is a color video monitor.

8. The apparatus of claim 7 wherein said color video monitor is an R-G-B-S analog level, signal-type monitor.

9. The apparatus of claim 1 wherein said first means includes a digitizing board.

10. The apparatus of claim 9 wherein said first means further includes means responsive to a first software program to address said digitizing board for storage of said backgrounds in separate files in said computer memory.

11. The apparatus of claim 10 wherein said second means includes means responsive to a second software program for retrieving the pictorial background selected by the user from said computer memory, integrating it with the pose of the user as seen by said video camera to form a set of integrated electronic pulses, and sending the integrated electronic pulses to said video monitor for display to the user and sending the integrated electronic pulses to said video printer for transfer to said paper.

12. The apparatus of claim 1 including a booth, comprising:
   a) an enclosure bounded by separate front and rear walls held in spaced-apart relation by a pair of spaced-apart end walls, said walls joined together along their vertical edges and topped by a roof;
   b) an opening formed in said front wall to allow access to an alcove formed in a first part of the interior of said enclosure, separated from the interior mutually exclusive to said first part of the interior by an equipment wall spanning said front and rear walls;
   c) a curtain slidingly hung across said opening to shut out light from outside said alcove when desired by the user;
   d) an openable door spanning between one end wall and said opening having a slot formed therein aligned with an output slot of said printer through which said finished pictures pass to the user outside said enclosure; and
   e) a plurality of buttons are mounted on said wall for pressing by the user to select a pictorial background in which to have integrated with his or her self-portrait and portrayed on said video monitor and, after capture of the user's pose, sent to and printed on said paper.

13. The apparatus of claim 12 including a stool in said alcove for use by the user to rest as he or she adjusts their pose before said video camera.

14. A process of producing a printed picture carrying a self-portrait of a user integrated within a pictorial background selected by the user comprising the steps of:

a) providing an initiation device that produces electronic commands in response to a user input;
   b) providing a computer and a set of timed instructions therefor that define a series of operating sequences in response to commands from said initiation device;
   c) providing an analog video camera to view the user, receiving a video impression of the user and transforming said video impression into a series of digitized electronic impulses;
   d) providing a video monitor including a monitor for viewing by the user, activated in sequence by said computer instructions, for displaying the real time image of the user received in said video camera;
   e) providing a first means to receive a plurality of pictorial backgrounds and converting them into separate files of digitized electronic impulses and further providing a memory in which to store said files for selective withdrawal;
   f) providing means within reach of the user to select a pictorial background from said memory;
   g) providing second means in said computer, activated by said selector means, for digitally combining said series of digitized electronic impulses of the user with said file of digitized electronic impulses of the pictorial background selected by the user and transferring combined electronic impulses in an electronic array to said monitor screen for displaying to the user;
   h) providing a color video printer, loaded with a charge of electronically-printable paper, and activated in sequence by said computer instructions, for receiving said electronic array, comprising the pictorial background and a fixed pose of the user, and printing, in response thereto, a finished color representation of the user, integrated in said selected background, on one side of said paper as a finished picture; and
   i) illuminating the user.

15. The process of claim 14 including the step of providing a series of lights to illuminate the user and enhance the video impression received in said video camera.

16. The process of claim 14 including the step of providing a manual computer keyboard operably connected to said computer to address instructions to said computer.

17. The process of claim 16 wherein the step of providing a manual keyboard operably connected to said computer is followed by the step of providing an additional set of instructions in said computer to test each component's operation and produce a signal in response thereto.

18. The process of claim 14 wherein the step of providing means within reach of the user to select a pictorial background from said computer memory is accompanied by the step of providing a set of electronic impulses and projecting them onto said video monitor as words of instruction to the user to select a pictorial background, advise the user of the time allowed to change poses in front of said video camera and alert the user when his or her pose is to be captured by said video camera and sent to said video printer.

19. The process of claim 14 wherein said color video camera is an R-G-B analog-type camera.

20. The process of claim 14 wherein said video monitor is a color video monitor.

21. The process of claim 20 wherein said color video monitor is an R-G-B-S analog level, signal-type monitor.

22. The process of claim 14 wherein said first means includes a digitizing board.

23. The process of claim 22 wherein said first means further includes a first software program for addressing said digitizing board for storing said backgrounds in separate files in said computer memory.

24. The process of claim 23 wherein said second means includes a second software program for retrieving the pictorial background selected by the user from said memory, integrating it with the pose of the user as seen by said video camera, and sending the electronic pulses for display to the user and sending the integrated electronic pulses to said color video printer for transfer to said paper.

25. The process of claim 14 including the additional steps of:
   a) providing a first series of interconnected wall, roof and floor panels surrounding said apparatus to form an equipment enclosure thereabout;
   b) providing an entry-way in said equipment enclosure for ingress and egress to said apparatus contained therein and further providing an aperture for passage of said finished picture from said printer to the user;
   c) providing a second series of interconnected wall and roof panels extending from said equipment enclosure to form a user enclosure adjacent thereto;
   d) providing an access way for ingress and egress for the user to and from said user enclosure; and
   e) providing a common wall between said equipment enclosure and said user enclosure providing therein:
      1) means for the user to activate said initiation device;
      2) a first aperture through which said video camera is aimed at the user;
      3) a second aperture through which said video monitor screen is aimed for viewing by the user; and
      4) means to select a pictorial background in which to have integrated with his or her self-portrait and portrayed on said video monitor and, after capture of the user's pose, sent to and printed on said paper.

26. The process of claim 25 including the additional steps of providing a curtain over said access way for drawing by the user to shut out light from said user enclosure.

27. The process of claim 25 including the additional steps of providing a stool in said user enclosure on which the user may sit during operation of the process.

28. The apparatus of claim 11, wherein the second means further includes an input device enabling user selection of a polygonal area of the pictorial background where the user's pose is to be integrated.

29. The apparatus of claim 28, wherein the polygonal area has a level of resolution at an individual pixel level.

* * * * *